United States Patent
Zacharias et al.

(10) Patent No.: US 8,638,581 B2
(45) Date of Patent: Jan. 28, 2014

(54) INVERTER CAPABLE OF PROVIDING REACTIVE POWER

(75) Inventors: Peter Zacharias, Kassel (DE); Regine Mallwitz, Kassel (DE); Samuel Vasconcelos Araújo, Kassel (DE); Benjamin Sahan, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 0 days.

(21) Appl. No.: 13/439,314

(22) Filed: Apr. 4, 2012

(65) Prior Publication Data
US 2012/0236616 A1   Sep. 20, 2012

Related U.S. Application Data

(63) Continuation of application No. PCT/EP2010/065231, filed on Oct. 11, 2010.

(30) Foreign Application Priority Data

Oct. 9, 2009   (EP) .................................... 09172672

(51) Int. Cl.
*H02M 7/5387* (2007.01)

(52) U.S. Cl.
USPC .......................................... 363/132; 323/207

(58) Field of Classification Search
USPC ......... 363/41, 97, 98, 131, 132; 323/205, 207
See application file for complete search history.

(56) References Cited

U.S. PATENT DOCUMENTS

| 5,021,936 | A   | * | 6/1991  | Nishizawa et al. ............. 363/41 |
| 8,094,475 | B2  | * | 1/2012  | Friebe et al. .................. 363/132 |
| 8,199,541 | B2  | * | 6/2012  | Yang .............................. 363/89 |
| 2005/0286281 | A1 |   | 12/2005 | Victor et al. |
| 2006/0013024 | A1 |   | 1/2006  | Temesi et al. |
| 2010/0277837 | A1 | * | 11/2010 | Myhre et al. .................... 361/18 |

FOREIGN PATENT DOCUMENTS

| DE | 4135680    | A1 |   | 5/1993 |
| DE | 19732218   | C1 | * | 3/1999 |
| EP | 1369985    | A2 |   | 12/2003 |
| EP | 1369985    | B1 |   | 5/2009 |

OTHER PUBLICATIONS

Michael Frisch and Temesi Ernoe, Vincotech: "High Efficient Topologies for Next Generation Solar Inverter" Taken from www.bodospower.com. 5 Pages, Jul. 2008.
International Search Report & Written Opinion of the International Search Authority for International Application No. PCT/EP2010/065231. 16 Pages, Apr. 2012.

(Continued)

*Primary Examiner* — Gary L Laxton
(74) *Attorney, Agent, or Firm* — Eschweiler & Associates, LLC (57) ABSTRACT

In an inverter includes two input lines for connection to a DC voltage source, two half-bridges connecting the two input lines, and two output lines for connection to an alternating current load or an AC power grid. Each half-bridge includes two pulse-operated switches with reverse connected diodes, each output line is connected to a center point of one of the half-bridges via an inductance, and the two output lines are connected to the same one of the input lines via a further pulse-operated switch behind the inductance with respect to the associated half-bridge.

17 Claims, 8 Drawing Sheets

(56) References Cited

OTHER PUBLICATIONS

Bodo's Power Systems, Issue Aug. 2008, pp. 20 to 24, Michael Frisch and Temesi Ernoe, Vincotech: "High Efficient Topologies for Next Generation Solar Inverter"; also published on the website of Vincotech (XP-002571175, Jul. 31, 2008, pp. 1-6).

Michael Frisch and Temesi Ernoe, Vincotech: "High Efficient Topologies for Next Generation Solar Inverter" Taken from www.bodospower.com. 5 Pages.

International Search Report & Written Opinion of the International Search Authority for International Application No. PCT/EP2010/065231. 16 Pages.

* cited by examiner

INVERTER CAPABLE OF PROVIDING REACTIVE POWER

REFERENCE TO RELATED APPLICATIONS

This application is a continuation of PCT/EP2010/065231, filed Oct. 11, 2010, that claims priority to European Patent Application No. 09 172 672.9, filed on Oct. 9, 2009, the contents both of which are incorporated by reference in their entirety.

FIELD

The invention relates to an inverter comprising two input lines for connection to a DC voltage source and two output lines for connection to an alternating current load or an AC power grid.

BACKGROUND

Various topologies for inverters for photovoltaic systems are known from the Journal Bodo's Power Systems, Issue August 2008, pages 20 to 24, Michael Frisch and Temesi Ernö, Vincotech: "High Efficient Topologies for Next Generation Solar Inverter". An inverter comprising two half-bridges connecting the two input lines and each half-bridge comprising two pulse-operated switches with reverse connected diodes belongs to these topologies as depicted in FIG. 13 of the publication. In the inverter, the switches arranged between the center points of the half-bridges and one of the input lines are IGBT semiconductor switches pulse-operated at the frequency of the alternating current output by the inverter of for example 50 Hz and connected in anti-parallel with external freewheeling diodes. The switches connected between the center points of the half-bridges and the other input lines are MOSFET semiconductor switches pulse-operated at a higher frequency of, for example, 16 kHz to form a sine-shaped output current of the inverter by means of pulse width modulation. These MOSFET semiconductor switches comprise inherent reverse connected diodes. According to the publication referenced here, such MOSFET semiconductor switches are not suitable on the other side of the half-bridges as their inherent diodes are too slow. For this known inverter, an EE (Euro Efficiency) at 2 kW nominal power of 99.2% is indicated. As the switches on the one side of the half-bridges are pulse-operated at an output frequency of the inverter, such as 50 Hz, it is not necessary to filter the current flowing through them. Thus, in the publication referenced here, it is proposed to connect the switches provided between the center points of the half-bridges and the one of the input lines only behind the respective inductance, directly between the respective output line and the one of the input lines, wherein, however, the respective freewheeling diode remains between the center point of the half-bridge and the one input line. A corresponding inverter is depicted in FIG. 14 of the publication. In this inverter, the IGBT semiconductor switches may be replaced by MOSFET semiconductor switches. In this way, an EE increased to 99.4% at 2 kW nominal power is achieved by this inverter, if the diodes remaining directly between the center points of the half-bridges and the one of the input lines are SiC diodes. The actual efficiency is told to be even higher, as the MOSFET semiconductor switches pulse-operated at the frequency of the alternating current output do not reach the temperature of 125° C. the simulation is based on. This efficiency is very high, and it is achieved with just a small number of parts. However, this known inverter—due to its topology—is generally only suitable for outputting pure active power. The statement of the publication referenced here that using FRED-FET semiconductor switches and accepting the disadvantages accompanied therewith including a reduced efficiency, the inverter would also be able to output reactive power, is not correct. Anyhow, in the publication referenced here, it is proposed to supplement the inverter of the already amended topology by two further SiC diodes each between one of the shifted semiconductor switches and the other input line, and to connect the center points of the thus formed additional half-bridges, each via an additional inductance, to the output lines for outputting reactive power. The topology of this inverter suitable for providing reactive power and depicted in FIG. 16 of this publication thus includes a total of four half-bridges each consisting of a semiconductor switch and a SiC diode, wherein the semiconductor switches in one pair of half-bridges are adjacent to the one and the semiconductor switches in the other pair of half-bridges are adjacent to the other input line, wherein an inductance is connected between the center point of each half-bridge and the respective output line, wherein the center points of one half-bridge per pair are connected to the same output line, and wherein the inductances each filtering towards one input line are coupled. Here, the use of SiC Schottky diodes is recommended. As the flowing current is filtered by two inductances in this topology, the high efficiency of the previously described inverter not suitable for providing reactive power, cannot be achieved.

It is further known that the two switches of each of two half-bridges of an inverter may be high frequency pulse-operated in diagonally arranged pairs to generate a sine-shaped output current of the inverter. One then refers to bipolar modulation. In bipolar modulation the output voltage high frequency jumps between the two input potentials of the inverter resulting in a high current ripple in the inductances. A further disadvantage is that the current freewheeling through the reverse connected diodes runs through the input side capacitances, resulting in additional losses due to the internal reactive power flow within the inverter. This known inverter is, however, generally suited for outputting reactive power.

There still is a need of an inverter with a high efficiency and the capability of outputting reactive power.

SUMMARY

The invention relates to an inverter comprising two input lines for connection to a DC voltage source; two half-bridges connecting the two input lines; and two output lines for connection to an alternating current load or an AC power grid. Each half-bridge comprises two pulse-operated switches with reverse connected diodes; and each output line is connected to a center point of one of the half-bridges via an inductance. Both output lines are connected to the same one of the input lines each via one further pulse-operated switch and behind the inductance with respect to the associated half-bridge.

In the inverter, all output lines, in addition to the half-bridges composed of two switches each, are connected directly, i.e. without an inductance being interconnected, to the same input line behind the respective inductance with respect to the respective half-bridge. The inverter thus comprises a total of six pulse-operated switches. It may not only be regarded as an inverter with two half-bridges each comprising two switches supplemented by the two further switches between the output lines and the one of the input lines, but also as having the very high efficiency supplemented by additional switches between the center points of the half-bridges and the one input line in parallel to the diodes provided there. The new inverter thus comprises the functionality of having high efficiency in outputting active power as well as the functionality of outputting reactive power.

In the inverter, each output line, via a further diode, may be additionally connected to the other input line behind the inductance with respect to the associated half-bridge. The output lines are thus each also connected to the two input lines via a half-bridge comprising one of the further switches and one of the further diodes. Here, the further diodes limit the incoming transient grid over-voltages to the input DC voltage between the input lines. As a result, the inverter is insensitive to such over-voltages.

The reverse connected diode of each half-bridge provided between the center point of the half-bridge and the one of the input lines is a Schottky diode, in particular a SiC Schottky diode in one embodiment. The switching behaviour of such diodes particularly well fulfils the requirements of a fast switching present here. The switches connected in parallel to these diodes are IGBT semiconductor switches without inherent diodes in one embodiment. The combination of these parts has an advantageous effect on the switching losses of the reverse connected diode during freewheeling of the current in outputting active power by the new inverter.

In the same context, it is advantageous in one embodiment if the switch provided between the center point of each half-bridge and the other input line is a MOSFET semiconductor switch comprising an inherent reverse connected diode. In outputting active power, the MOSFET semiconductor switch is only active as a switch, whereas the freewheeling path extends over the reverse connected diodes of the switches connected to the one of the input lines. The inherent reverse connected diode of the MOSFET semiconductor switch only carries current in outputting reactive power.

As the inherent reverse connected diodes of the further switches are not relevant here and as they optionally may completely be avoided, each further switch directly provided between one of the output lines and the one of the input lines may be an IGBT semiconductor switch or a thyristor semiconductor switch (without inherent reverse connected diode) but also a MOSFET semiconductor switch (with inherent diode) that may have advantages with regard to the efficiency in outputting active power. The direct use of thyristors for the further switches is possible, because, at least in pure active power operation, the high frequency pulse-operated switch provided between the center point of one of the half-bridges and the other input line, leads the current flowing through the associated closed thyristor at the end of the respective sine-shaped half wave of the output alternating current back to zero and thus extinguishes or switches off the thyristor.

In the inverter, one of the two output lines may be grounded to set it to a fixed ground potential, as it is regularly the case with the zero conductor of a single-phase AC power grid. On the other hand, the input line cannot be grounded and thus, the inverter is only suitable for such DC voltage sources not requiring grounding of any current carrying line to the inverter.

With regard to the immunity to interference of the inverter, it proves to be beneficial if the one of the input lines connectable to the output lines via the further switches is provided for the positive polarity of the respective DC voltage source with respect to ground. In this case, the voltage supply and signals for drivers of the switches provided between the center points of the half-bridges and the other one of the input lines need not to be generated with regard to a switched reference potential. This is an advantage, as these switches, in contrast to the respective other switches, are high frequency pulse-operated in outputting reactive power by the new inverter.

Generally, it is possible that a controller of the inverter only operates four of the total of six switches, whereas it keeps open the two other switches or at least does not switch currents with them, in every operation mode of the new inverter.

In an operation mode of the inverter for outputting pure active power, the controller, for example, pulse-operates the further switches at the output frequency of the inverter whereas it pulse-operates the switches arranged between the center points of the half-bridges and the other one of the input lines at a frequency which is higher by a multiple to provide the desired sine-shape to the current output. In another operation mode of the inverter for outputting pure active power in which the input DC voltage present between the input lines is boosted to, for example, enable feeding into the AC power grid even in case of an input voltage already below the peak voltage of the connected AC power grid, the controller alternatingly temporarily keeps close the switches arranged between the center points of the half-bridges and the other input line, whereas it pulse-operates the further switches at a frequency which is by a multiple higher than the output frequency of the inverter. The operation of the inverter in this case compares to two boost converters, whereas the function principle in the previously described operation mode compares to two buck converters. The efficiency of the inverter in boosting the input DC voltage is not as good as in the previously described operation mode; this, however, is not relevant as long as only with boosting the input DC voltage a feeding power of the inverter may still be realized.

For outputting reactive power by the inverter, the controller pulse-operates the switches of the half-bridges crosswise, i.e. one switch connected to the one of the input lines of one half-bridge and the switch connected to the other one of the input lines of the respective other half-bridge are synchronously opened and closed. The switches are, in one embodiment, pulse-operated at a frequency that is a multitude higher than the output frequency of the inverter. In this way, for example, the output alternating current may be formed with a desired phase shift phi relative to the phase of the voltage of a connected AC power grid.

To utilize the high efficiency of the inverter in feeding active power over maximized periods of time, the controller may also implement a power factor of the output alternating current deviating from cos phi=1 by outputting pure active power and pure or at least nearly pure reactive power blockwise, each block comprising one or several grid phase periods. In one embodiment the controller switches between the output of active power and reactive power in a zero crossing of the voltage to make use of favorable conditions for these changes.

If several inverters are connected in parallel, a superordinate controller may in a similar way implement a power factor of the collectively output alternating current by outputting pure active power by a first number of inverters and reactive power by a second number of inverters. At least in cases where a power factor of cos phi=1 is required, at least the reactive power providing inverters should be inverters according to the invention in order to output reactive power as an alternative. The parallel connection may definitely also include individual inverters different to the inverters according to the present invention, to output pure active power at a high efficiency. If the requested power factor only slightly deviates from the criterion cos phi=1, the plurality of the inverters will provide active power, and just a small group of the inverters will provide reactive power. The division into active power providing and reactive power providing inverters may be made dynamically by a superordinate controller so that, for example, each inverter temporarily provides active power, so that the reactive power is not provided by the same inverter(s) over a greater period of time. In this way, by means of a quick change of the assignment of the inverters as reactive or active power providing inverters, it can be achieved that the entire power provided by the DC voltage sources may still be fed into the connected AC power grid. The feeding of active power which is interrupted during a period of time in which the inverter provides reactive power may be caught up during a successive period of time in which the inverter provides active power.

Further developments of the invention result from the claims, the description and the drawings. Advantages of features and of combinations of several features mentioned in the introductional part of the description are only exemplary and may come into effect alternatively or cumulatively, without the necessity that the advantages have to be achieved by embodiments of the invention. Further features can be taken from the drawings—particularly from the depicted relative arrangement and operational connections of several parts. The combination of features of different embodiments of the invention and of features of different claims is also possible and is encouraged herewith. This also applies to such features depicted in separate drawings or mentioned in their description. These features may also be combined with features of different claims.

BRIEF DESCRIPTION OF THE DRAWINGS

In the following, the invention will be further explained and described by means of preferred embodiment examples with reference to the attached drawings.

DETAILED DESCRIPTION

Particularly, the invention relates to an inverter comprising two half-bridges connecting the two input lines, wherein each half-bridge comprises two pulse-operated switches with reverse connected diodes, and wherein each output line is connected to a center point of one of the half-bridges via an inductance. Here, the features that the input lines are provided for connection to the AC voltage source and that the two half-bridges connect the two input lines, even in combination, do not necessarily mean that a voltage provided by the AC voltage source is directly applied to the half-bridges. Instead, it is sufficient that the voltage provided by the AC voltage source results in a voltage across the half-bridges.

The AC voltage source may, for example, be a photovoltaic system or a wind power system, i.e. a regenerative source of energy, but it may also be a fuel cell or a battery. The inverter supplies the electric energy coming from the DC voltage source to a single alternating current load or, via an AC power grid, to a plurality of alternating current loads.

Figure 1:
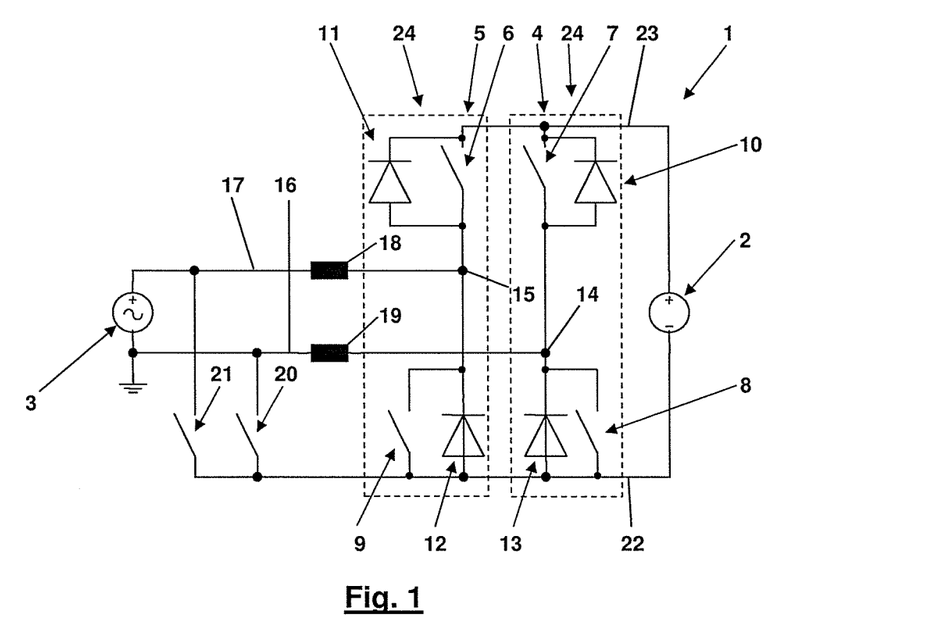
FIG. 1 shows a first embodiment of an inverter.

Now referring in greater detail to the drawings, an inverter 1 depicted in FIG. 1 serves to feed electric energy from a DC voltage source 2, for example a photovoltaic system, into an AC power grid 3. The inverter comprises two half-bridges 4 and 5 each including two switches 7 and 8, and 6 and 9, respectively, with reverse connected diodes 10 and 13, and 11 and 12, respectively. Between each center point 14 and 15 of the half-bridges 4 and 5 and output lines 16 and 17 guiding to the AC power grid 3, an inductance 18 or 19, respectively, is arranged as a current filter. Behind the inductances 18 and 19, with respect to the center points 14 and 15, further switches 20 and 21 are directly connected between the output lines 16 and 17 and one of the input lines 22 of the inverter 1. This input line 22 is associated with a negative potential here, whereas the other input line 23 of the inverter is associated with a positive potential. The one input line 16 is grounded by grounding a terminal of the AC power grid 3 here. The switches 6 and 7 between the center points 14 and 15 and the other input line 23 of the inverter are, for example, made as MOSFET semiconductor switches 24 with inherent diodes 10 and 11 here. On the other hand, the switches 8 and 9 between the center points 14 and 15 and the one input line 22 are IGBT semiconductor switches with separate diodes 12 and 13 connected in antiparallel orientation. The switches 20 and 21 may also be IGBT or even MOSFET semiconductor switches. The switches 6 and 7 as well as the switches 8 and 9 are configured to be pulse-operated at a high frequency by a controller of the inverter 1 not depicted here, whereas the switches 20 and 21 in this embodiment of the inverter 1 are configured to be pulse-operated at the grid frequency of the AC power grid 3.

In the inverter 1 according to FIG. 1, the voltage supply of the controller and the signals for the drivers of the switches 6 and 7 that are—as will be explained in the following—most frequently switched are generated against a switched reference potential. This is a disadvantage with regard to the necessary efforts and the interference immunity.

Figure 2:
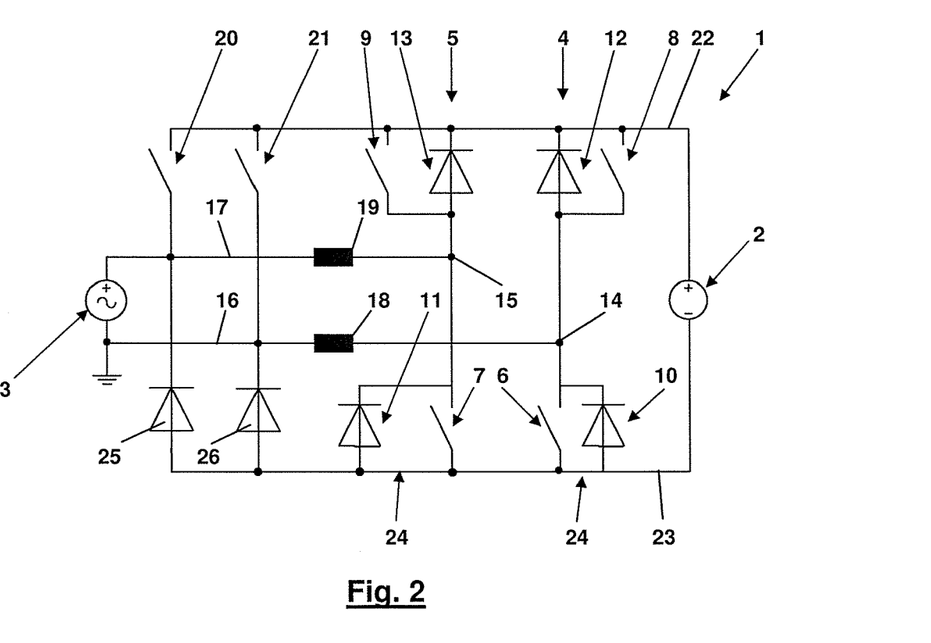
FIG. 2 shows a second embodiment of an inverter with another reference potential for the driver circuitry and with additional diodes protecting against grid over-voltages.

FIG. 2 shows a modification of the inverter 1 eliminating this disadvantage by connecting in this case the high frequency pulse-operated switches 6 and 7 to the negative terminal of the DC voltage source 2. Further, in the inverter 1 according to FIG. 2, two additional diodes 25 and 26 are provided delimiting incoming transient over-voltage pulses due to grid disturbances to the DC voltage of the DC voltage source. Thus, the inverter 1 according to FIG. 2 becomes as insensitive with regard to such disturbances as inverter topologies known under the catchwords H5, Heric or full bridge.

The function principle when pure active power is output by the inverter 1 according to FIG. 1 and FIG. 2 is identical. It is based on two buck converters each modulating the output current for one polarity of the grid voltage. Referring to FIG. 1, for the positive polarity, the current is modulated by pulse-operating the switch 6 at a high frequency, and such current flows through the inductance 18. Upon switching off the switch 6, the current freewheels through the diode 12. For the negative polarity, the current is modulated by pulse-operating the switch 7 at a high frequency, and the current flows through the inductance 19. Upon switching off the switch 7, the current freewheels through the diode 13. With the aid of the additional switches 20 and 21 pulse-operated at the grid frequency, these two buck converters are combined in such a way that the current flows through the connected AC power grid 3 in a positive or negative direction. For this purpose, both switches 20 and 21 each remain switched on during one grid half wave and thus close the current circuit. During this output of active power depicted in FIGS. 3a and 3b for the inverter 1 according to FIG. 1 and in FIGS. 4a and 4b for the inverter 1 according to FIG. 2 each for positive (a) and negative (b) grid current, the switches 8 and 9 remain opened, and the diodes 10 and 11 are also not active, i.e. without current. Here it is an advantage that in this active power operation the current does not freewheel through the reverse connected diodes 10 and 11 of the high frequency pulse-operated switches 6 and 7. The switches 6 and 7 may thus be beneficially made as MOSFET semiconductor switches. On the other hand, the diodes 12 and 13 guiding the freewheeling current are preferably made as SiC Schottky diodes.

Figure 3A:
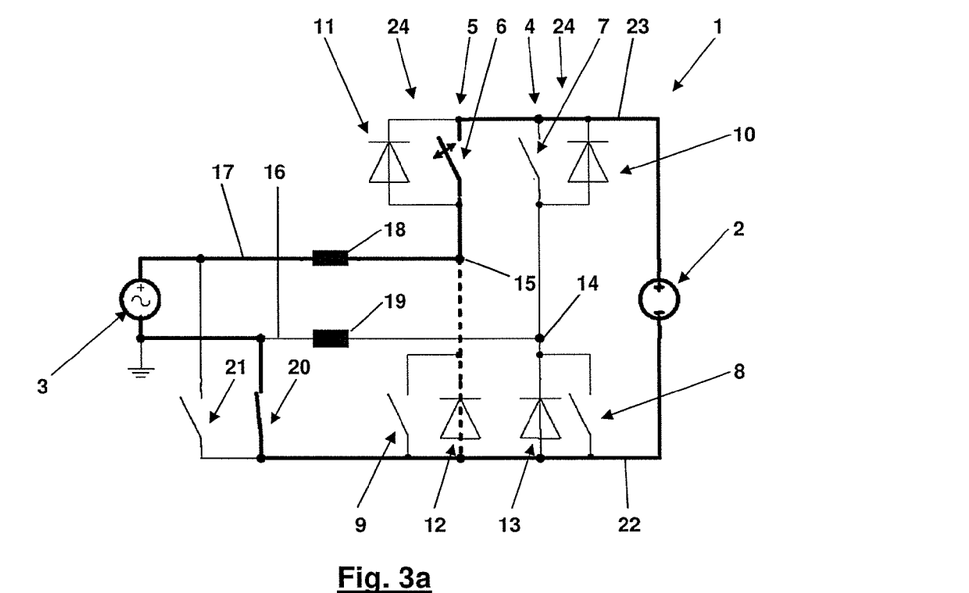
FIGS. 3a and 3b illustrate the operation of the switches in a first operation mode with a pure active power output of the inverter according to FIG. 1 at positive (FIG. 3a) and negative (FIG. 3b) grid current.
Figure 3B:
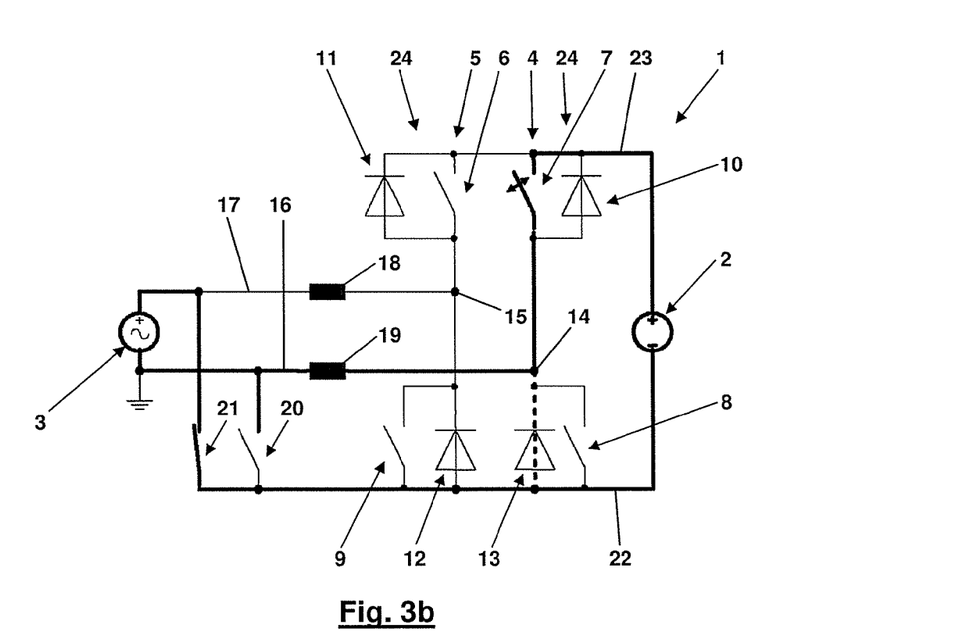
Figure 4A:
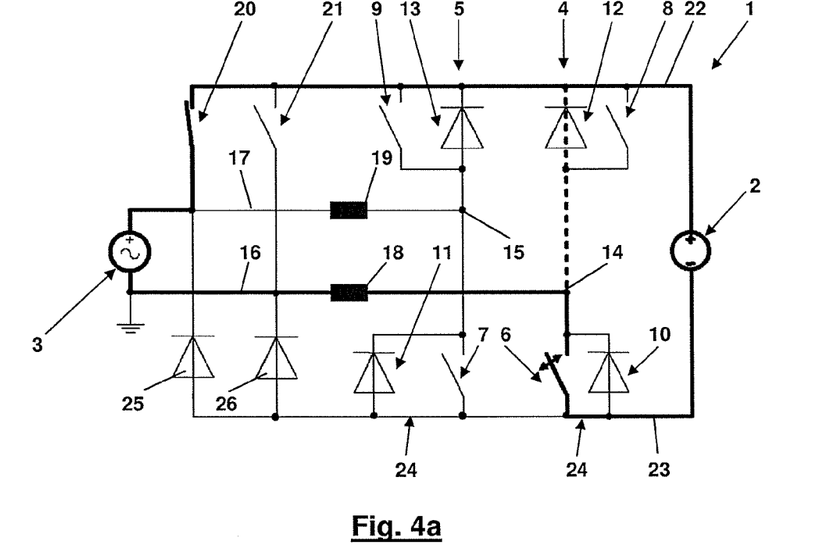
FIGS. 4a and 4b illustrate the operation of the switches in a first operation mode with a pure active power output of the inverter according to FIG. 2 at positive (FIG. 4a) and negative (FIG. 4b) grid current.
Figure 4B:
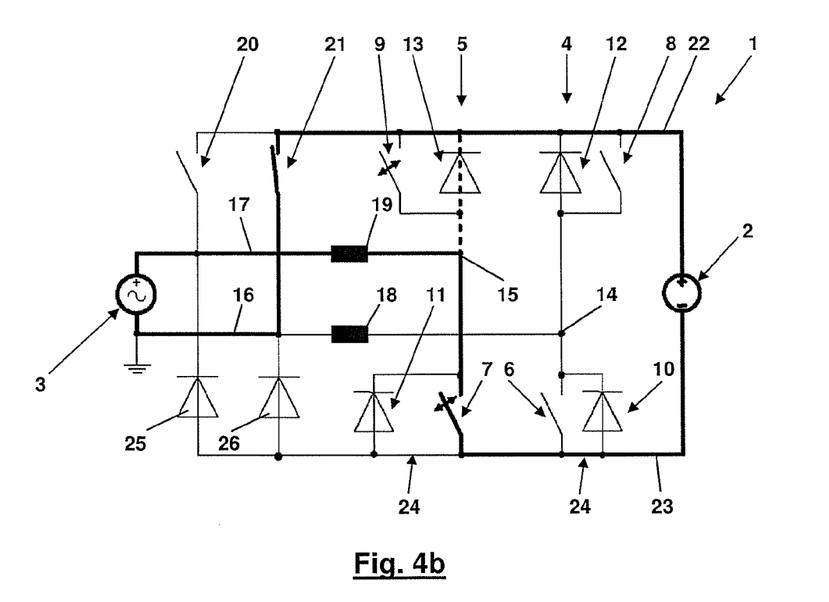
Figure 5:
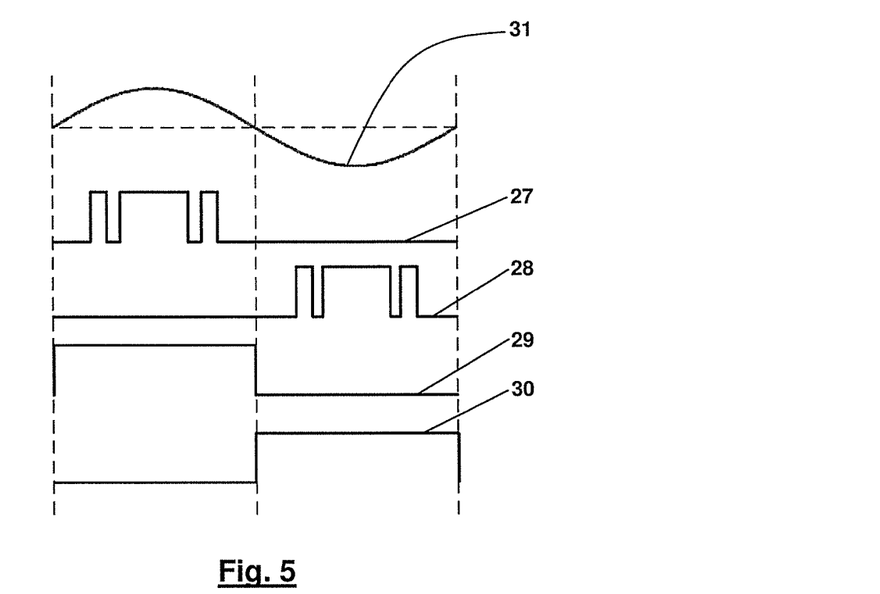
FIG. 5 illustrates the control signals for the inverter according to FIG. 1 or FIG. 2 when outputting pure active power.
Figure 6:
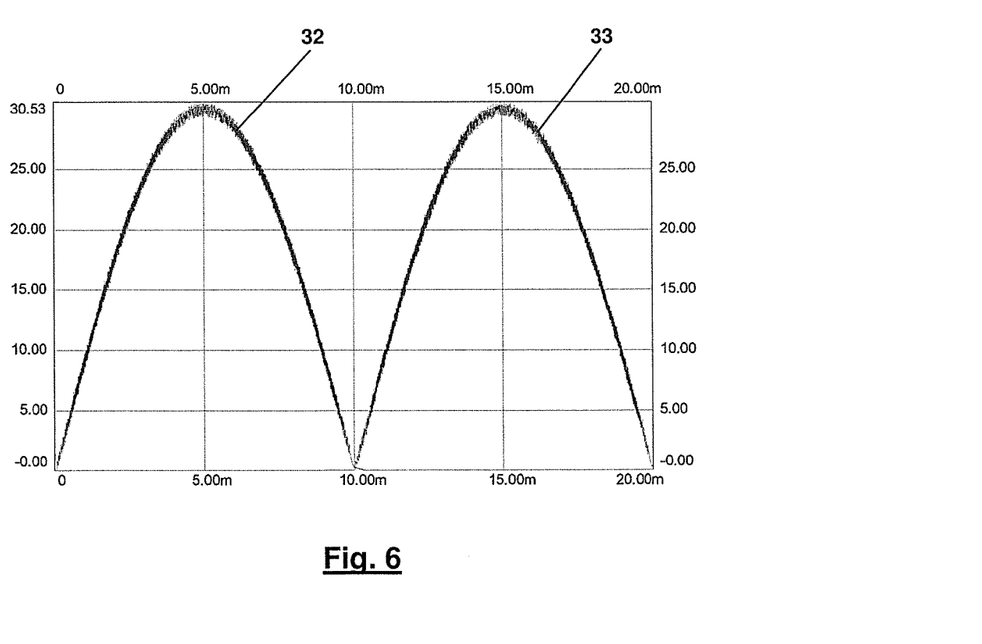
FIG. 6 illustrates the currents through the inductances in the output lines of the inverter according to FIG. 1 and FIG. 2 when outputting pure active power.
Figure 7:
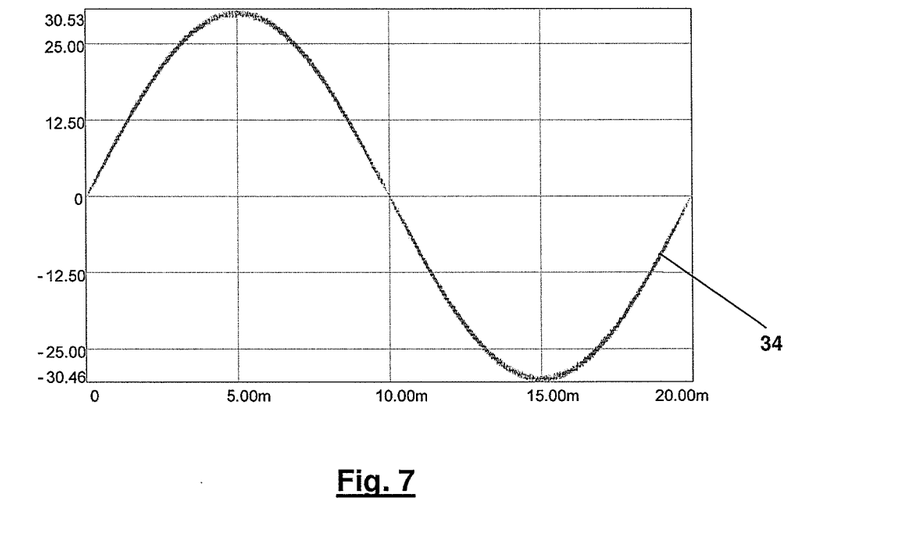
FIG. 7 illustrated the grid current curve resulting from the currents according to FIG. 6.

FIG. 5 shows the control signals 27 to 30 for the switches 7 and 6, and 20 and 21 in relation to the two half waves of the grid current 31 of the AC power grid 3 during the output of active power according to FIGS. 3a and 3b and 4a and 4b. FIG. 6 shows the resulting currents 32 and 33 through the inductances 18 and 19; whereas FIG. 7 shows the resulting grid current 34 through the AC power grid 3.

Figure 8:
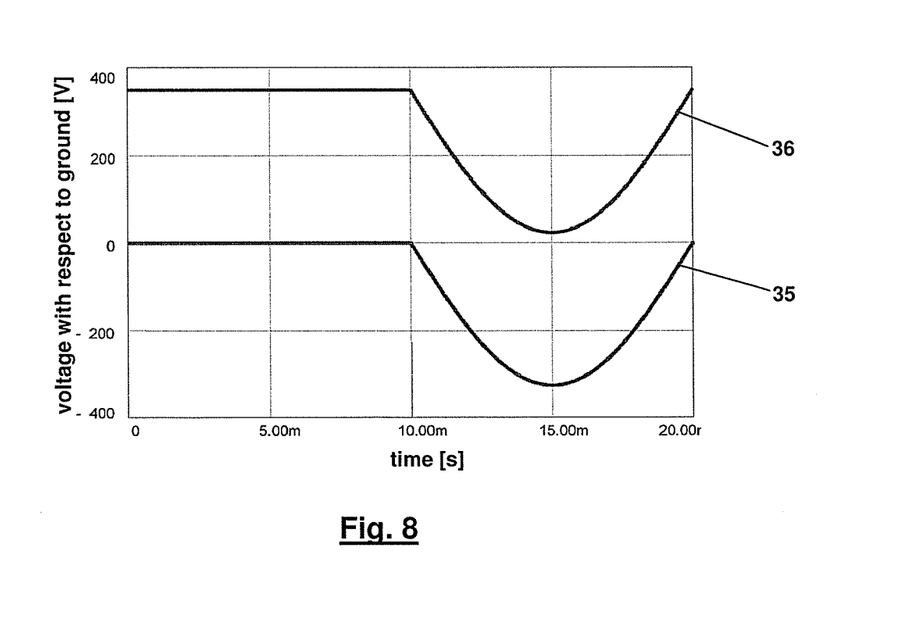
FIG. 8 illustrates the potential curves at the input lines of the inverter when the inverter according to FIG. 1 outputs pure active power.
Figure 9:
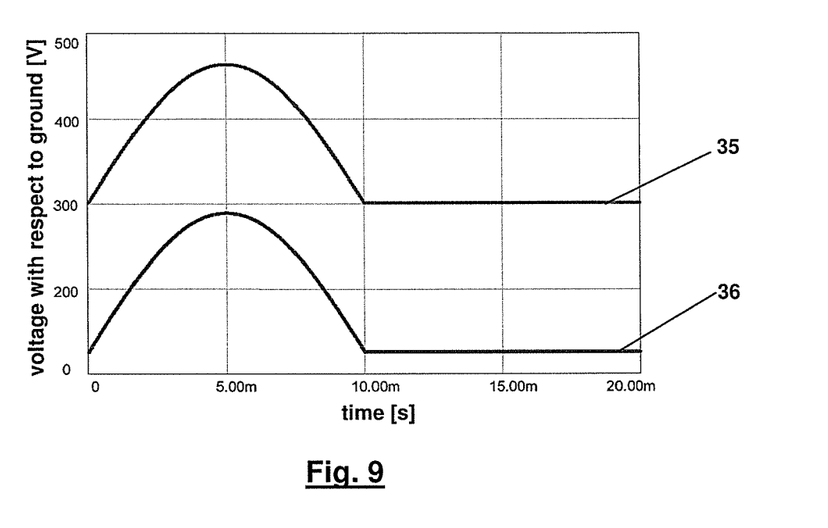
FIG. 9 illustrates the potential curves at the input lines of the inverter when the inverter according to FIG. 2 outputs pure active power.

FIG. 8 depicts the resulting potential curves 35 and 36 at the input lines 22 and 23 and the corresponding terminals of the DC voltage source 2 during output of active power according to FIGS. 3a and 3b, whereas FIG. 9 depicts the corresponding potential curves 35 and 36 of the input lines 22 and 23 during output of active power according to FIGS. 4a and 4b. When outputting active power, the input line 22 of the inverter 1 is connected to the ground potential of the one terminal of the AC power grid via the switch 20 during one half wave of the grid voltage, and with the phase of the AC power grid via the switch 21 during the other half wave. Thus, high frequency potential jumps of the terminal lines of the DC voltage source are not possible. Correspondingly, there are no high frequency leakage currents.

Figure 10A:
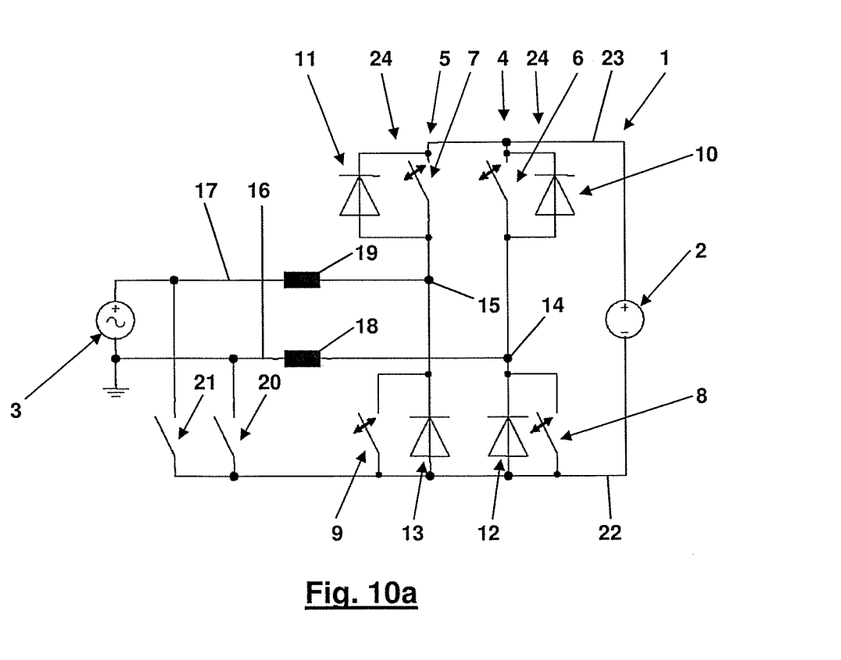
FIGS. 10a and 10b illustrate the operation of the switches for outputting reactive power by the inverter according to FIG. 1 (in FIG. 10a) and FIG. 2 (in FIG. 10b).

The switches 20 and 21 are deactivated in a zero crossing of the grid voltage, and subsequently the other four switches 6 to 9 are pulse-operated at a high frequency as a full bridge with DC voltage link feeding a current of a variable power factor via the inductances 18 and 19 into the AC power grid, for changing the inverter 1 from outputting active power to outputting reactive power. The switches 6 and 9, and 7 and 8 are, for example, controlled with symmetrical, i.e. bipolar pulse width modulation here. In this operation mode, all reverse connected diodes 10 to 13 are active as freewheeling diodes. Here, the switches 6 and 9, and 7 and 8, respectively, which are in a cross-over arrangement, are pulse-operated together in a suitable way to generate the reactive current which is required at present. FIG. 10a illustrates the control of the switches 6 and 9 at a high frequency in the inverter 1 according to FIG. 1, and FIG. 10b in the inverter 1 according to FIG. 2. Likewise, other operation modes of the bridge switches may be considered for providing the required curve of the reactive current. Thus, it is for example possible to provide the presently required reactive current by means of collectively pulse-operating the switches 6 and 7, and 8 and 9, respectively, which are connected with the same input line 22 or 23, respectively.

Figure 10B:
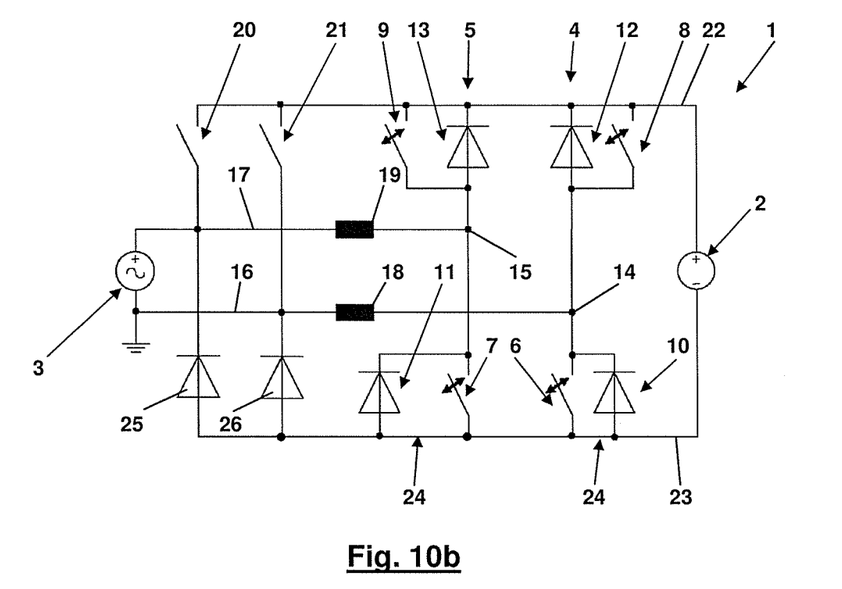
Figure 11:
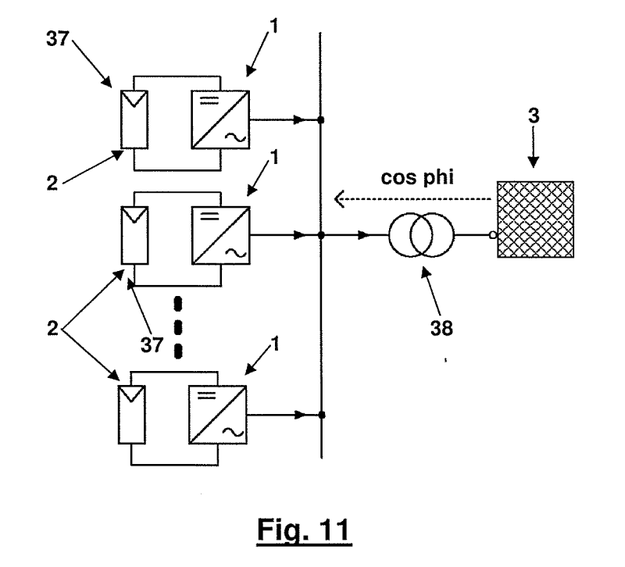
FIG. 11 shows a parallel connection of several inverters for feeding electric energy at a power factor of cos phi≤1 into an AC power grid.

In case of the requirement of static reactive power over a longer period of time, several inverters 1 as illustrated in FIG. 11 may be interconnected for outputting electric energy from a corresponding DC voltage source being a photovoltaic system 37 in this example. The interconnection does not only relate to the common output of electric power via one transformer 38 into the AC power grid but also to the joint provision of a power factor deviating from cos phi=1. To provide such a power factor, normally being still close to 1, without accepting the lower efficiency of the inverter 1 in outputting reactive power according to FIGS. 10a and 10b with all inverters 1, a superordinate controller may only operate one or a few of the inverters 1 according to FIG. 11 for outputting reactive power, whereas all other inverters 1 output pure active power.

Figure 12:
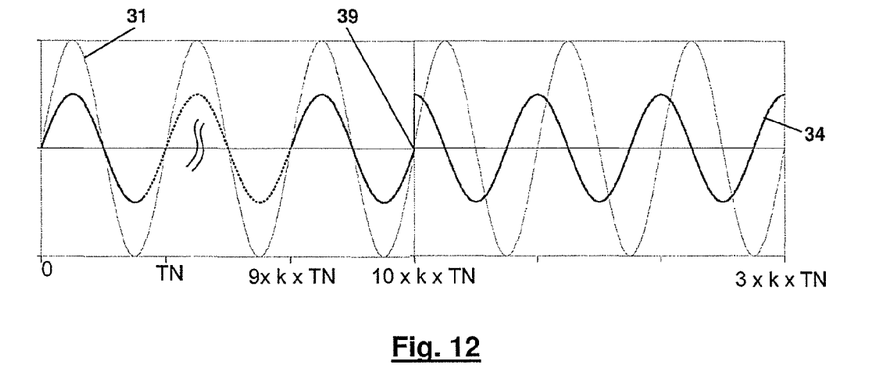
FIG. 12 illustrates the change between the output of pure active power and pure reactive power in an inverter according to FIG. 1 or FIG. 2.

In each individual inverter 1, a power factor deviating from cos phi=1 may be provided with an efficiency still high on average in that pure active power according to FIGS. 3a and 3b or FIGS. 4a and 4b and pure reactive power according to FIGS. 10a and 10b are fed phase by phase. This is illustrated in FIG. 12. If, for example, a power factor of cos phi=0.95 is requested, the inverter 1 feeds full active power, i.e. a grid current 34 in phase with the grid voltage 31 over 10*k periods of the grid voltage 31, and full reactive power at a phase offset between the grid voltage 31 and the grid current 34 of 90° or π/2 over 3*k periods. Here, the changes between the two operation modes occur in a zero crossing 39 of the grid voltage. By switching off the high frequency pulse-operated switches 8 and 9, a demagnetization of the inductances 18 and 19 may be achieved very quickly as they are designed for currents pulsed at a high frequency. Thus, it is possible to quickly change from one operation mode to the other.

Figure 13:
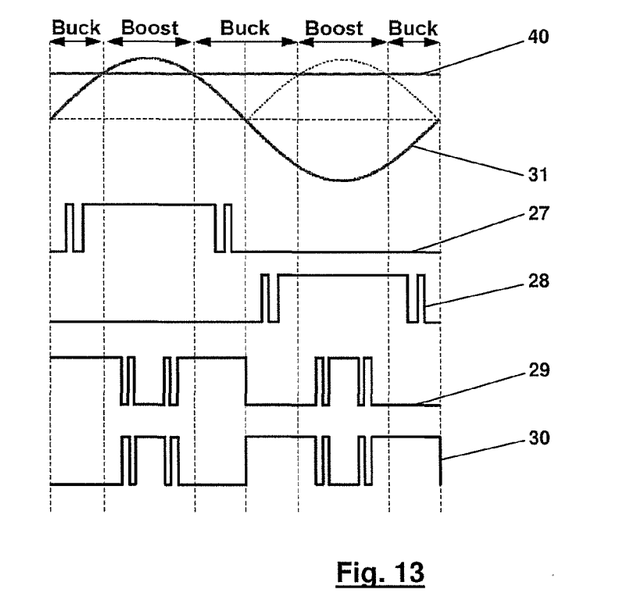
FIG. 13 shows the control signals in an alternative operation mode of the inverter according to FIG. 1 or FIG. 2 for outputting pure active power, if the input DC voltage between the input lines of the inverter is smaller than the peak voltage of a connected AC power grid.

FIG. 13 illustrates a control of the switches 7 and 6 as well as 20 and 21 by means of the control signals 27 to 30 (assigned to the switches in the sequence of their reference numerals) in outputting pure active power by the inverter 1 boosting the input DC voltage 40 between the input lines 22 and 23, as an alternative to FIG. 5. In boosting for the positive polarity of the output wave, the switch 7 remains switched on during a boost operation mode. In the meanwhile, the switch 20, like the switch of a boost converter, pulses at a high frequency, whereas the switch 21 fulfils the freewheeling function, i.e. it pulses complementarily with regard to the switch 20. In boosting for the negative polarity, the switch 6 correspondingly remains switched on, whereas the switch 21 pulses at a high frequency and the switch 20 fulfils the freewheeling function. This boost operation mode is of particular interest if the input DC voltage 40 between the input lines 22 and 23, i.e. the output voltage of the DC voltage source 2 is smaller than the peak value of the grid voltage. In this way, it is possible to feed electric energy into the DC power grid 3 over an expanded range of input voltages. For this purpose, the boost operation mode needs to be applied only for those sections of the period of the grid voltage 31 where the amplitude of the grid voltage 31 exceeds the input DC voltage 40, as it is depicted in FIG. 13. The described boost operation mode is accompanied with an increase of the conduction losses, as the switches 7 and 6 conduct the entire current and as during the freewheeling phase two switches 7 and 20, and 6 and 21, respectively, are present in each power current path. On the other hand, the conduction losses are reduced as only the low blocking switches 20 and 21 pulse at a high frequency. It also has to be considered that in this operation mode the potential of the DC voltage source with respect to ground is switched at a high frequency. Correspondingly, this operation mode is only allowed if a galvanic separation is present or if the DC voltage source, like in case of batteries of fuel cells, has no capacitance with respect to ground.

Many variations and modifications may be made to the preferred embodiments of the invention without departing substantially from the spirit and principles of the invention. All such modifications and variations are intended to be included herein within the scope of the present invention, as defined by the following claims.

The invention claimed is:

1. An inverter, comprising:
    two input lines configured to connect to a DC voltage source;
    two half-bridges connected to the two input lines, wherein the two half-bridges are connected together in parallel; and
    two output lines configured to connect to an alternating current load or an AC power grid;
    wherein each half-bridge comprises two pulse-operated switches with reverse connected diodes, and wherein a first output line of the two output lines is connected to a center point of a first half-bridge of the two half-bridges via a first inductance, and a second output line of the two output lines is connected to a center point of a second half-bridge of the two half-bridges via a second inductance, and wherein both of the two output lines are connected to a same one of the two input lines via a respective one further pulse-operated switch, and wherein the connection of the further pulse-operated switches to the two output lines is behind the first and second inductances, respectively, with respect to the first and second half-bridges, respectively,
    wherein the controller is configured to pulse-operate the switches of the half-bridges in a criss-cross manner at a frequency that is a multiple greater than the output frequency of the inverter and keep open the two further pulse-operated switches, in an operation mode of the inverter for outputting reactive power.

2. The inverter of claim 1, wherein each output line is connected to another one of the input lines via a further diode and wherein the connection of the further diodes to the output lines is behind the inductance with respect to the associated half-bridge.

3. The inverter of claim 1, wherein the reverse connected diodes of each half-bridge is provided between the center point of the respective half-bridge and one of the input lines, and comprises a Schottky diode.

4. The inverter of claim 1, wherein each of the two half-bridges comprise two series-connected switches connected together at the center point thereof, and wherein a switch of the series-connected switches is provided between the center point of each respective half-bridge and one of the two input lines comprise an IGBT semiconductor switch.

5. The inverter of claim 4, wherein a switch of the series-connected switches is provided between the center point of each respective half-bridge and the other one of the two input lines comprises a MOSFET semiconductor switch.

6. The inverter of claim 1, wherein each further switch comprises an IGBT semiconductor switch, a thyristor semiconductor switch, or a MOSFET semiconductor switch.

7. The inverter of claim 1, wherein one of the two output lines is grounded.

8. The inverter of claim 1, wherein one of the two input lines is provided for the positive polarity of the DC input source with reference to ground.

9. The inverter of claim 1, further comprising a controller configured to, in every operation mode of the inverter, pulse-operate four of a total number of six switches and keep open the other two switches.

10. The inverter of claim 9, wherein the controller is configured to pulse-operate the further switches at an output frequency of the inverter, and to pulse-operate the switches that are arranged between the center points of the half-bridges and the other input line at a frequency that is greater than the output frequency by a multiple, in one operation mode of the inverter for outputting pure active power.

11. The inverter of claim 9, wherein the controller is configured to alternatingly temporarily keep close the switches arranged between the center points of the half-bridges and the other input line, and to simultaneously pulse-operate the further switches at a frequency that is by a multiple greater than the output frequency of the inverter, in one operation mode of the inverter for outputting pure active power at a boosted input DC voltage.

12. The inverter of claim 9, wherein the controller is configured to implement a power factor of the output alternating current deviating from cos phi=1 by outputting pure active power and pure reactive power blockwise, each block extending over a period or several periods of the output alternating current.

13. The inverter of claim 12, wherein the controller is configured to change between the operation modes for outputting active power and reactive power in a zero crossing of the output voltage.

14. An inverter, comprising:
    a first input terminal and a second input terminal configured to couple to a DC voltage source having a first terminal and a second terminal, respectively;
    a first half-bridge circuit comprising a first switch and a second switch connected together in series at a first center point, wherein the first half-bridge circuit is coupled between the first input terminal and the second input terminal;
    a second half-bridge circuit comprising a third switch and a fourth switch connected together in series at a second center point, wherein the second half-bridge circuit is coupled between the first input terminal and the second input terminal;
    a first output line and a second output line together configured to couple to an AC grid, wherein the first output line has a first terminal of a first inductance coupled to the first center point of the first half-bridge circuit, and a second terminal of the first inductance forming a first output terminal, and wherein the second output line has a first terminal of a second inductance coupled to the second center point of the second half-bridge circuit, and a second terminal of the second inductance forming a second output terminal;
    a fifth switch coupled between the first output terminal and the second input terminal; and
    a sixth switch coupled between the second output terminal and the second input terminal;

a controller configured to control the first, second, third, fourth, fifth, and sixth switches to operate selectively in one of an active power mode and a reactive power mode, wherein in the reactive power mode, the controller is configured to open the fifth and sixth switches, and alternately switch the first and fourth switches and the second and third switches so as to operate the first half-bridge circuit and the second half-bridge circuit together as a full-bridge circuit.

15. The inverter of claim 14, further comprising a plurality of reverse-connected diodes, wherein each reverse-connected diode is coupled in parallel with a one of the first, second, third and fourth switches, respectively.

16. The inverter of claim 14, wherein in the active power mode, the controller is configured to open the second and fourth switches, alternately switch the fifth and sixth switches at a first switching frequency, and alternately switch the first and third switches at a second switching frequency that is greater than the first frequency.

17. The inverter of claim 14, wherein the first and third switches comprise a metal oxide semiconductor field effect transistor (MOSFET) switch, and the second and fourth switches comprise an insulated gate bipolar transistor (IGBT) switch.

* * * * *